(12) United States Patent
Huda et al.

(10) Patent No.: US 11,305,369 B2
(45) Date of Patent: Apr. 19, 2022

(54) ENGINE-BASED WELDER WITH AUTO-START FEATURE

(71) Applicant: Lincoln Global, Inc., Santa Fe Springs, CA (US)

(72) Inventors: Shahrul Huda, Scarborough (CA); Bernard T. Vanderbyl, Toronto (CA)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 362 days.

(21) Appl. No.: 16/434,290

(22) Filed: Jun. 7, 2019

(65) Prior Publication Data
US 2020/0070271 A1   Mar. 5, 2020

Related U.S. Application Data

(60) Provisional application No. 62/724,147, filed on Aug. 29, 2018.

(51) Int. Cl.
*B23K 9/10* (2006.01)

(52) U.S. Cl.
CPC .......... *B23K 9/1043* (2013.01); *B23K 9/1012* (2013.01)

(58) Field of Classification Search
CPC .... B23K 9/1043; B23K 9/095; B23K 9/1012; B23K 9/06; B23K 9/0956; B23K 9/1006
See application file for complete search history.

(56) References Cited

U.S. PATENT DOCUMENTS

| 5,864,116 | A | 1/1999 | Baker |
| 6,040,556 | A | 3/2000 | Shinya et al. |
| 8,338,971 | B2 | 12/2012 | Fosbinder et al. |
| 8,987,638 | B2 | 3/2015 | Hiroi et al. |
| 9,314,866 | B2 | 4/2016 | Lambert et al. |
| 9,381,593 | B2 | 7/2016 | DuVal et al. |

(Continued)

FOREIGN PATENT DOCUMENTS

| CN | 102896402 A | 1/2013 |
| CN | 104416264 A | 3/2015 |
| JP | 2001-018063 A | 1/2001 |

OTHER PUBLICATIONS

Extended European Search Report from Corresponding Application No. EP19194226.7; dated Jan. 16, 2020; pp. 1-5.

(Continued)

*Primary Examiner* — Brian W Jennison
(74) *Attorney, Agent, or Firm* — David J. Muzilla

(57) ABSTRACT

In one embodiment, a welding system includes an engine and a generator connected to the engine. The welding system also includes a power source having a controller. The power source is electrically connected to a welding electrode and a workpiece. The controller determines that an electrical load on the welding system has not been detected for a first time period while the engine is running, determines that a coolant temperature meets a minimum requirement, commands shutdown of the engine when the load has not been detected for the first time period and when the coolant temperature meets the minimum requirement, determines that the load has been detected (due to a single contact of the welding electrode to the workpiece) during a second time period after the engine has been shut down, and commands restart of the engine when the load has been detected during the second time period.

20 Claims, 11 Drawing Sheets

(56) References Cited

U.S. PATENT DOCUMENTS

| | | | |
|---|---|---|---|
| 9,573,216 B2 | 2/2017 | Enyedy et al. | |
| 9,943,924 B2 | 4/2018 | Denis et al. | |
| 2006/0157459 A1* | 7/2006 | Fosbinder | B23K 9/1006 219/130.21 |
| 2010/0193489 A1 | 8/2010 | Beeson et al. | |
| 2011/0152962 A1* | 6/2011 | Behm | A61N 1/3706 607/10 |
| 2012/0138582 A1* | 6/2012 | Radtke | B23K 9/10 219/121.27 |
| 2012/0138587 A1* | 6/2012 | Fosbinder | B23K 9/1006 219/133 |
| 2014/0144897 A1 | 5/2014 | Stava et al. | |
| 2017/0259368 A1 | 9/2017 | Enyedy | |
| 2017/0326670 A1* | 11/2017 | Enyedy | F02N 11/0862 |

OTHER PUBLICATIONS

Miller Electric MFG. Co.; "Big Blue 300 Pro;" http://www.onesourcerental.com/specs/miller_300pro_specs.pdf; Index No. ED/5.21; Dated Sep. 2011; pp. 1-8.

Lincoln Electric Company; "Red-D-Arc DX350 Operator's Manual;" https://www.red-d-arc.com/pdf/Red-D-Arc-DX350-Diesel-Welder-Operator-Manual-IM10468.pdf; Dated March 2018; pp. 1-44.

Lincoln Electric Company; "It's Three in One—Welder, Generator and Air Compressor;" https://www.lincolnelectric.com/assets/global/products/k2725-3/e6217.pdf; Dated Feb. 2016; pp. 1-10.

Sugihara, et al.; "The Voltage Reducing Device for Engine Driven AC Arc Welder;" China University, Department of Engineering; https://www.jstage.jst.go.jp/article/qjjws1943/42/1/42_1_9/_pdf/-char/en; Dated 1973; pp. 9-17.

Lincoln Electric Company; "Vantage® 410 CE Operator's Manual;" https://assets.lincolnelectric.com/assets/EU/OperatorManuals/IM2076rev00-ENG.pdf; Dated Oct. 2016; pp. 1-38.

\* cited by examiner

ENGINE-BASED WELDER WITH AUTO-START FEATURE

CROSS REFERENCE TO RELATED APPLICATIONS/INCORPORATION BY REFERENCE

This U.S. Patent Applications claims priority to and the benefit of U.S. Provisional Patent Application Ser. No. 62/724,147, filed on Aug. 29, 2018, the disclosure of which is incorporated herein by reference in its entirety. Also, U.S. Pat. No. 9,573,216, issued on Feb. 21, 2017, is incorporated herein by reference in its entirety.

FIELD

Embodiments of the present invention relate to systems and methods related to engine-driven welders. In particular, embodiments of the present invention relate to systems and methods providing an automatic start feature.

BACKGROUND

Arc welding machines can be powered by engine generators, allowing the arc welding machines to be operated independent of a source of utility power. Such arc welding machines can have welding power outputs and auxiliary power outputs that allow welding devices and other auxiliary electrical devices (loads) to be operated. Certain loads may operate intermittently, and it can be wasteful to keep the engine-generator running when a load is off. To conserve fuel, the engine-generator can be turned off when a load is not on or active. However, the engine-generator will then have to be turned back on when a load is subsequently operational.

SUMMARY

It would be desirable to provide an arc welding system having an engine-generator in which the engine-generator can be automatically started and stopped based on the presence or absence of a load. Embodiments of the present invention include systems and methods related to engine-driven welding equipment. In accordance with one embodiment, an Auto-Start feature is provided that stops the engine after a user defined period of no welding activity. Welding can be started again simply by touching the electrode to the workpiece. However, in one embodiment, just prior to auto engine shutdown, a chopper circuit (or inverter circuit) of the welder is shut down and a sense circuit compares the external resistance across the output studs to a Tap Start resistance threshold. If the external resistance is below the threshold, the engine is not shut down and a "No-Load Period" countdown is reset. This avoids nuisance shutdowns and restarts when a very light load such as an across the arc wire feeder is connected.

In one embodiment, a welding system is provided. The welding system includes an engine and a generator operatively connected to the engine. The welding system also includes a welding power source operatively connected to the generator and the engine and having a controller, where the welding power source is configured to be electrically connected to a welding electrode and a workpiece. The controller is configured to determine that an electrical load on the welding system has not been detected for a specified no-load time period while the engine is running, determine that a coolant temperature meets a minimum requirement, command shutdown of the engine in response to determining that the electrical load has not been detected for the specified no-load time period and that the coolant temperature meets the minimum requirement, determine that the electrical load has been detected, in response to a single tap (contact) of the welding electrode to the workpiece, during a specified tap start active time period after the engine has been shut down, and command restart of the engine in response to determining that the electrical load has been detected during the specified tap start active time period. The electrical load may be a welding electrical load or an auxiliary electrical load. The specified no-load time period and/or the specified tap start active time period may be set by an operator of the welding system. In one embodiment, the controller is configured to determine that the electrical load has not been detected during the specified tap start active time period after the engine has been shut down, and completely shut down the entire welding system. In one embodiment, the single tap (contact) of the welding electrode to the workpiece provides that the welding electrode makes electrical contact with the workpiece for at least 50 milliseconds. In one embodiment, the welding system includes a battery configured to supply electrical power to at least the controller. The controller is configured to draw less electrical power from the battery after the tap start active time period has timed out than during the tap start active time period. In one embodiment, prior to the controller commanding shut down of the engine, the controller is configured to shut down a chopper or an inverter of the welding power source, compare an external resistance across output studs of the welding power source to a resistance threshold, and allow the engine to be commanded to be shut down unless the external resistance is above the resistance threshold. In one embodiment, when the external resistance is above the resistance threshold, the controller is configured to not command that the engine be shut down, and command resetting of a countdown of the first specified time period.

In one embodiment, a method of providing and auto-start feature capability for an engine-based welding system having a controller is provided. The method includes, when an engine of an engine-based welding system is running, a controller of the engine-based welding system determining that a remote shutdown code has been accepted or that there has been no electrical load detected for a first specified time period. The method also includes, when the engine of the engine-based welding system is running, the controller determining that a coolant temperature meets a minimum requirement. The method further includes the controller shutting down the engine in response to determining that the coolant temperature meets the minimum requirement and determining that no electrical load has been detected for the first specified time period. The method also includes the controller determining that the electrical load has been detected, in response to a single tap (contact) of a welding electrode to a workpiece, during a second specified time period after the engine has been shut down, and the controller commanding restart of the engine in response to determining that the electrical load has been detected during the second specified time period. The electrical load may be a welding electrical load or an auxiliary electrical load. The first specified time period and/or the second specified time period may be set by an operator of the welding system. In one embodiment, the method includes the controller determining that the electrical load has not been detected during the second specified time period after the engine has been shut down, and completely shutting down the entire engine-based welding system. In one embodiment, the single tap (contact) of the welding electrode to the workpiece provides that the welding electrode makes electrical contact with the workpiece for at least 50 milliseconds. In one embodiment, the method includes the controller drawing less electrical power from a battery of the engine-based welding system after the second specified time period has timed out than during the second specified time period. In one embodiment, the method includes, just prior to the controller shutting down the engine, the controller shutting down a chopper or an inverter of the engine-based welding system, the controller comparing an external resistance across output studs of the engine-based welding system to a resistance threshold, and the controller allowing the shutting down of the engine, unless the external resistance is above the resistance threshold. In one embodiment, the method includes, when the external resistance is above the resistance threshold, the controller not allowing the shutting down of the engine, and the controller resetting a countdown of the first specified time period.

Numerous aspects of the general inventive concepts will become readily apparent from the following detailed description of exemplary embodiments and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

The examples and figures herein are illustrative only and are not meant to limit the subject invention.

Embodiments of engine-based welders having an auto-start feature are disclosed. The auto-start feature stops the engine after a user defined period of no welding and/or auxiliary activity. Welding can be started again simply by touching the electrode to the workpiece. However, in one embodiment, just prior to auto engine shutdown, a chopper circuit (or inverter circuit) of the welder is shut down and a sense circuit compares the external resistance across the output studs to a "tap start resistance threshold". If the external resistance is below the threshold, the engine is not shut down and a "no-load time period" countdown is reset.

Figure 1:
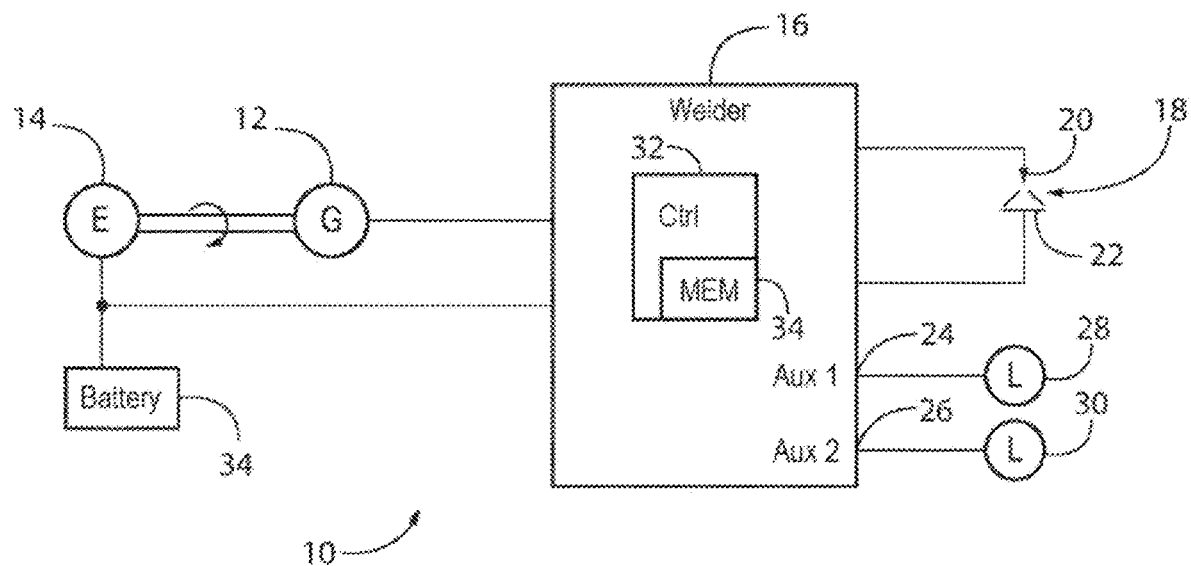
FIG. 1 illustrates a schematic block diagram of one embodiment of an engine-driven arc welding system (machine)

FIG. 1 illustrates a schematic block diagram of one embodiment of an engine-driven arc welding system (machine) 10. The welding system 10 includes a generator 12 driven by an engine 14 thereby forming an engine-generator. Example engines include diesel engines, gasoline engines, LP gas engines, and the like. The generator 12 generates electrical energy for powering a welding power supply 16 (or "welder"). The generator 12 can be a synchronous 3-phase alternator. However, the generator need not be a synchronous 3-phase alternator. For example, the generator could be a single phase alternator or a DC generator if desired. In certain embodiments, the generator 12 can have auxiliary windings for providing electrical power to auxiliary loads in addition to the welder 16.

The welder 16 includes circuitry for generating a welding waveform during arc welding. A welding operation is schematically shown in FIG. 1 as an electric arc 18 extending between a welding electrode 20 (consumable or non-consumable) and a workpiece 22. The welder 16 also includes circuitry for providing AC or DC power to one or more auxiliary power outputs 24, 26 (e.g., Aux1 and Aux2 in FIG. 4). The auxiliary power outputs 24, 26 are typically powered by the generator 12 and provide electrical power to auxiliary loads 28, 30. Example auxiliary loads that can be powered by the welder 16 include tools, lights, pumps, chargers and the like.

The auxiliary power outputs 24, 26 can include appropriate outlets for facilitating connections to the auxiliary loads 28, 30. Example outlets include, for example, NEMA standard outlets commonly found in North America, CEE outlets commonly found in Europe, and other styles of outlets. The auxiliary power outputs 24, 26 can include multiple styles of outlets to readily accommodate use in different geographical locations around the world, or the welder 16 can include appropriate adapters to convert one style of outlet to another.

The output voltage at the auxiliary power outputs 24, 26 is provided by, for example, one or more inverters within the welder 16. The welder 16 includes a controller 32 that is operatively connected to the inverter(s) to control the characteristics (e.g., frequency and voltage level) of the output voltage at the auxiliary power outputs 24, 26. Through known pulse width modulation techniques, the controller 32 can provide different voltage levels and frequencies at the auxiliary power outputs 24, 26. For example, when used in North America, the auxiliary power outputs 24, 26 can be controlled to provide 60 Hz power at a desired voltage level (e.g., 120V, 240V etc.). When used in Europe, the auxiliary power outputs 24, 26 can be controlled to provide 50 Hz power at a desired voltage level (e.g., 220V). Other frequencies and voltages are possible as well. For example, when used at an airport, the auxiliary power outputs can be controlled to provide 400 Hz power at 120V. The controller 32 can be an electronic controller and may include a processor. The controller 32 can include one or more of a microprocessor, a microcontroller, a digital signal processor (DSP), an application specific integrated circuit (ASIC), a field-programmable gate array (FPGA), discrete logic circuitry, or the like. The controller 32 can include a memory portion (e.g., RAM or ROM) storing program instructions that cause the controller to provide the functionality ascribed to it herein. For example, FIG. 9 herein discusses an example embodiment of a controller in more detail.

The arc welding system 10 includes an engine starting battery 34 for starting the engine 14. The engine 14 can be started automatically by the controller 32 or manually via appropriate user interface components on the engine-generator or welder 16. In addition to being operatively connected to the engine 14 (e.g., connected to a starting motor attached to the engine), the starting battery 34 is also connected to the welder 16 to provide temporary power to the auxiliary power outputs 24, 26 while the engine 14 is starting and before the output voltage of the generator 12 has reached its proper magnitude and frequency.

Figure 2:
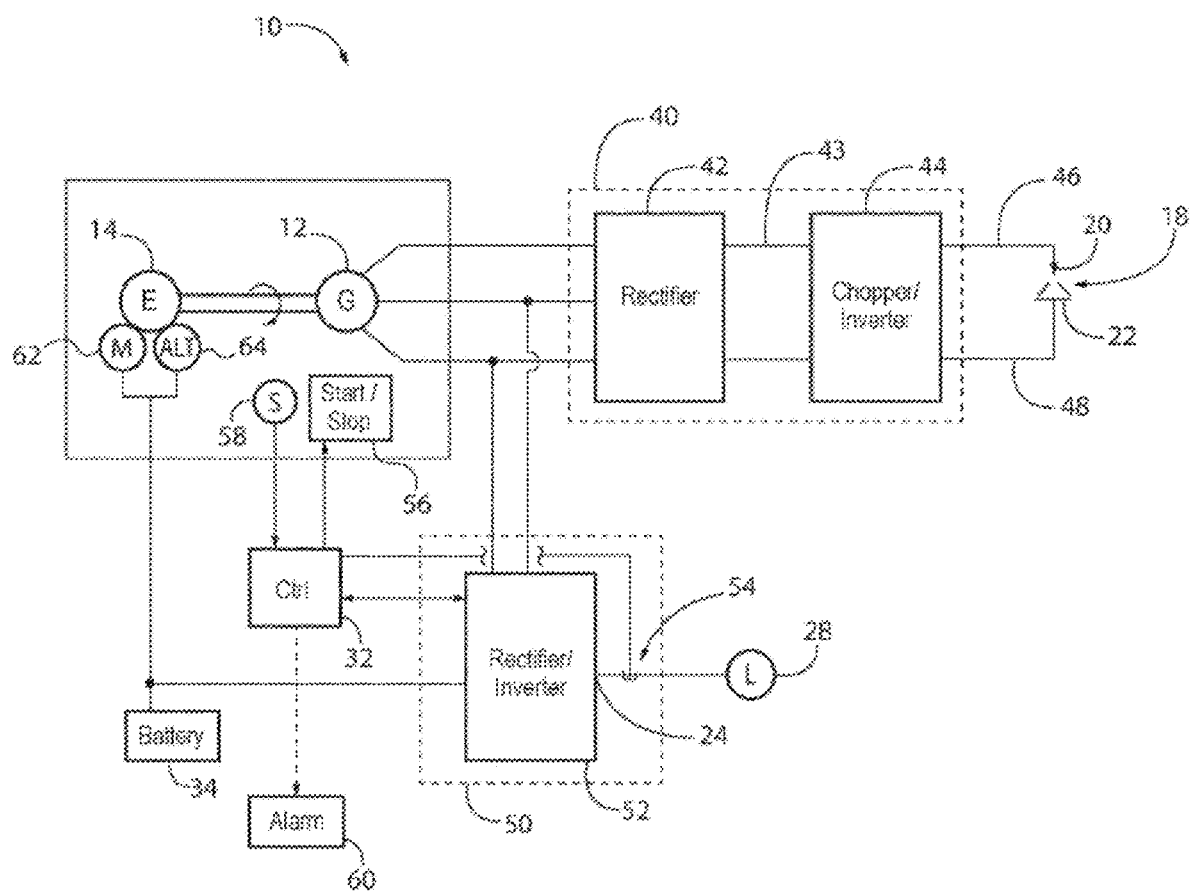
FIG. 2 illustrates another schematic block diagram of the engine-driven arc welding system (machine) of FIG. 1, showing additional details.

FIG. 2 illustrates another schematic block diagram of the embodiment of the engine-driven arc welding machine of FIG. 1, showing additional details. Armature windings in the generator 12 supply electrical power to a switching type power converter 40 within the welder. Example switching type power converters include DC choppers, inverters, and the like. AC power from the generator is rectified by a rectifier 42 within the power converter 40. The DC output from the rectifier 42 supplies the welder's DC bus 43. The DC bus 43, in turn, supplies electrical power to a switching circuit, such as a chopper or inverter 44.

Electrical leads 46, 48 from the chopper/inverter 44 provide a completed circuit for the arc welding current. The arc welding current flows from the chopper/inverter 44 through the electrode 20, across the arc 18, and through the workpiece 22. The welding electrode 20 and workpiece 22 are operatively connected to the switching type power converter 40 via the electrical leads 46, 48. The welding electrode 20 receives electrical energy from the switching type power converter 40 (as supplied by the engine-generator) for producing the arc 18.

In certain embodiments, controller 32 is operatively connected to the switching type power converter 40 to provide control signals to the switching type power converter to control the welding waveform. The controller 32 can monitor various aspects of the welding process via feedback signals (e.g., welding current/voltage) and adjust welding parameters during arc welding accordingly.

The controller 32 is further operatively connected to an auxiliary power supply 50 for supplying electrical energy to the auxiliary load 28 through the auxiliary power output 24. The auxiliary power supply 50 can include a rectifier/inverter 52 for converting the AC electrical power received from the generator 12 and the DC electrical power received from the starting battery 34 into a desired output voltage (e.g. AC) and frequency for the auxiliary load 28. The auxiliary power supply 50 can include an auxiliary load sensor 54 that detects the presence of an electrical load on the auxiliary power supply 50. The auxiliary load sensor 54 outputs a signal to the controller 32 indicating the presence of the electrical load. In FIG. 2, the auxiliary load sensor is shown as a current transformer. However, other types of electrical load sensors could be used, or the auxiliary power supply 50 could directly communicate the existence of an auxiliary load to the controller, such as via digital communications, a contact closure, etc.

Figure 3:
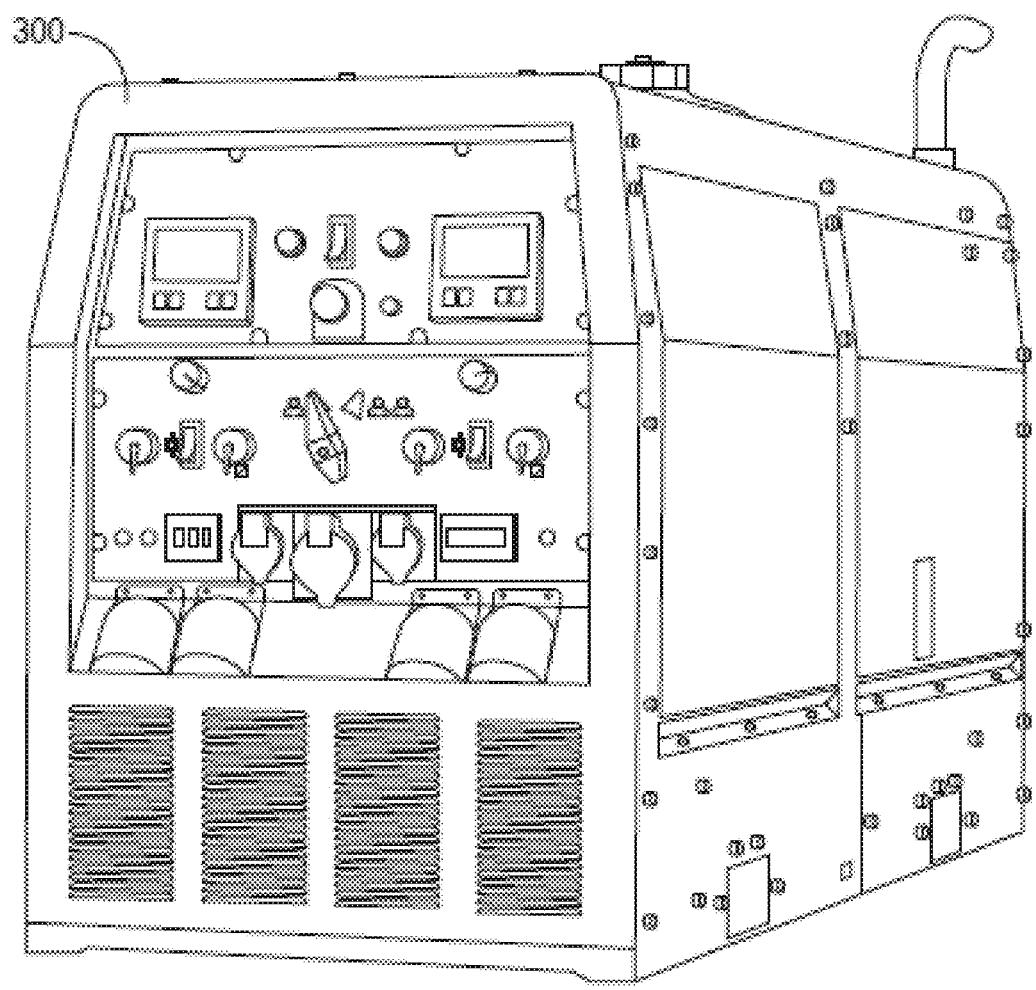
FIG. 3 illustrates one embodiment of an engine-based welding system (machine) that may share many of the same characteristics of the engine-driven welding system (machine) of FIG. 1 and FIG. 2.

FIG. 3 illustrates one embodiment of an engine-based welding system (machine) 300 that may share many of the same characteristics of the engine-driven welding system (machine) 10 of FIG. 1 and FIG. 2. The engine-based welder 300 of FIG. 3 is built for the construction site, the pipeline, and the rental fleet and includes two complete welders in one. Other embodiments may contain only one welder. In one embodiment, the engine-based welder 300 of FIG. 3 includes a 26.4 HP water cooled diesel engine which provides enough power for two operators to weld at the same time, or for one operator to gouge with up to a ⅜ inch (9.5 mm) carbon. In the embodiment of FIG. 3, there is just one machine to service and maintain instead of two. Sound reduction techniques are employed to substantially lower noise levels. Engine RPM varies based on the welding output required, resulting in less fuel being used and less noise being produced. An Auto-Start feature stops the engine after a user defined period of no welding/auxiliary load. Welding can be started again simply by touching the electrode to the workpiece a single time.

Figure 4:
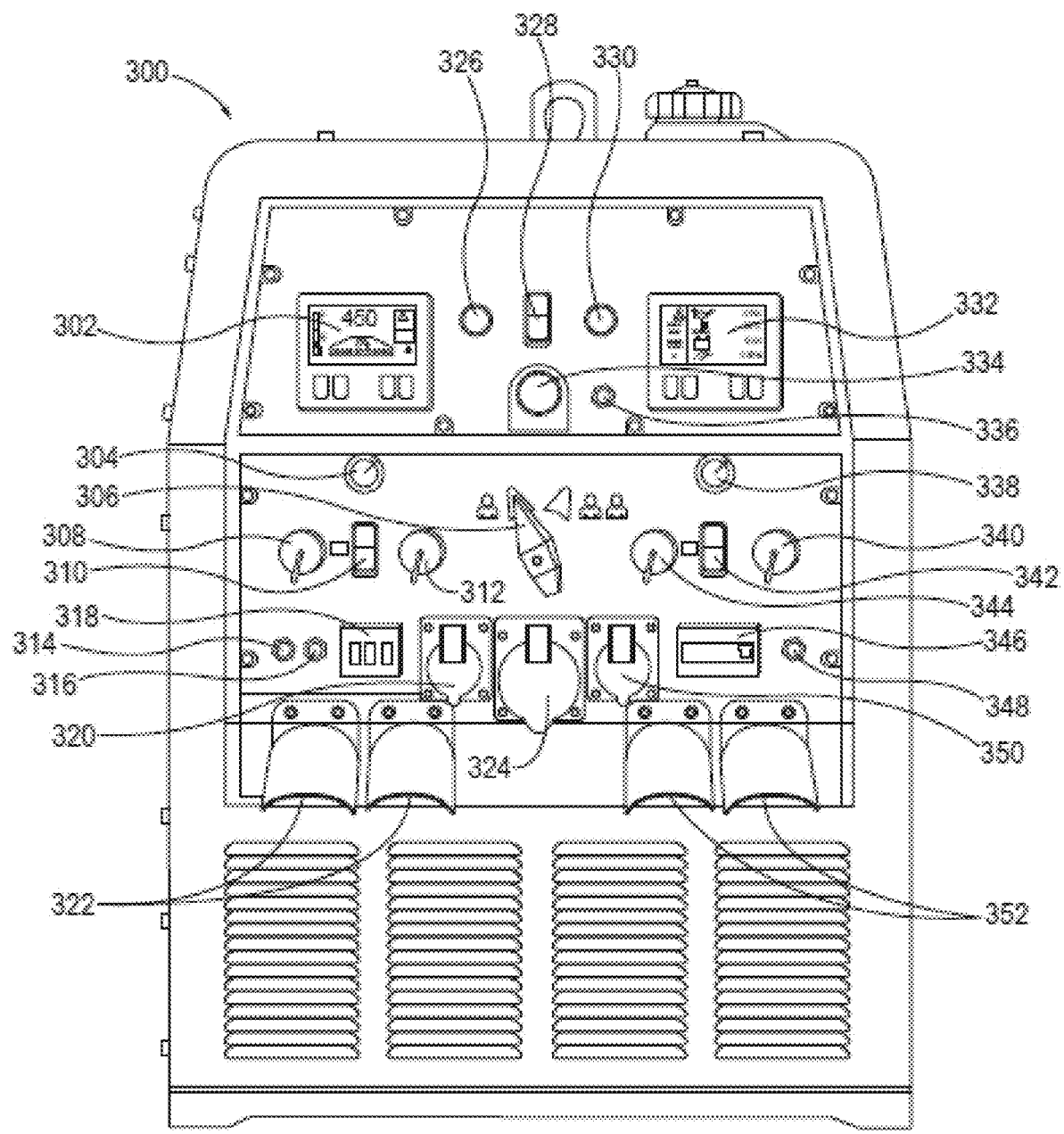
FIG. 4 illustrates the external controls of the engine-based welding system (machine) of FIG. 3.

FIG. 4 illustrates the controls of the engine-based welding machine 300 of FIG. 3. The controls include an LCD screen OperatorA 302, output control OperatorA 304, single/dual operator mode switch 306, wire feeder connection OperatorA 308, wire feeder polarity switch OperatorA 310, remote control connection OperatorA 312, 15 amp circuit breaker 314, 15 amp circuit breaker 316, 25 amp circuit breaker 318, 220V single phase AC Euro Plug 320, positive and negative weld terminal OperatorA 322, 380V three phase AC Euro Plug 324, glow plug push button 326, run/stop switch 328, start push button 330, LCD screen OperatorB 332, emergency stop 334, battery breaker 336, output control OperatorB 338, wire feeder connection OperatorB 340, wire feeder polarity switch OperatorB 342, remote control connection OperatorB 344, residual current device 346, wire feeder circuit breaker 348, 220V single phase AC Euro Plug 350, and positive and negative weld terminal OperatorB 352.

Figure 5:
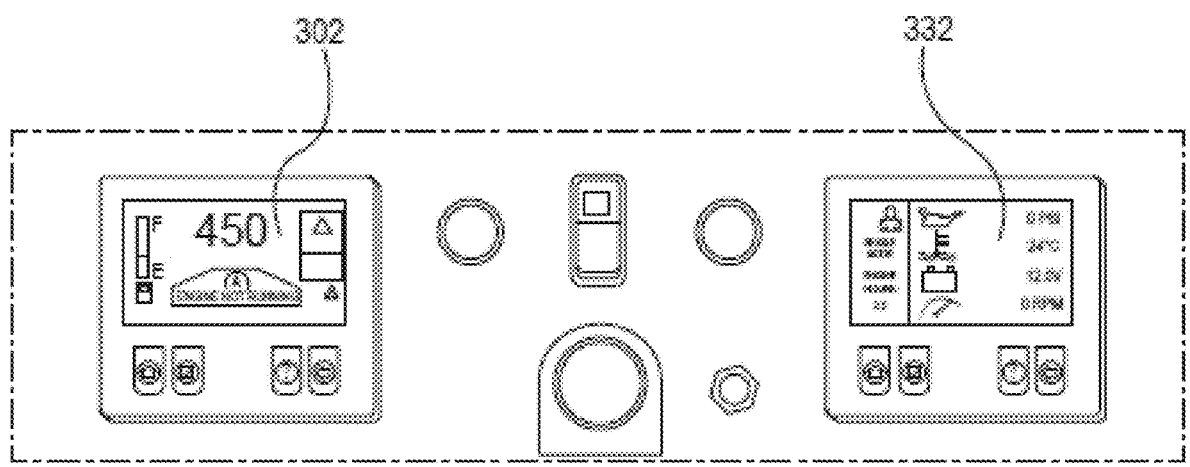
FIG. 5 illustrates LCD display screens of the engine-based welding system (machine) of FIG. 3 and FIG. 4.

FIG. 5 illustrates LCD display screens of the engine-based welding machine of FIG. 3 and FIG. 4. The two LCD screens 302 and 332 are color LCD screens that provide increased functionality and easier setup. Intuitive push and turn controls make setup very efficient and guide the user to the correct weld settings. Maintenance reminders assist with maximizing engine life and reliability.

Auto-Start Feature Details

Figure 6:
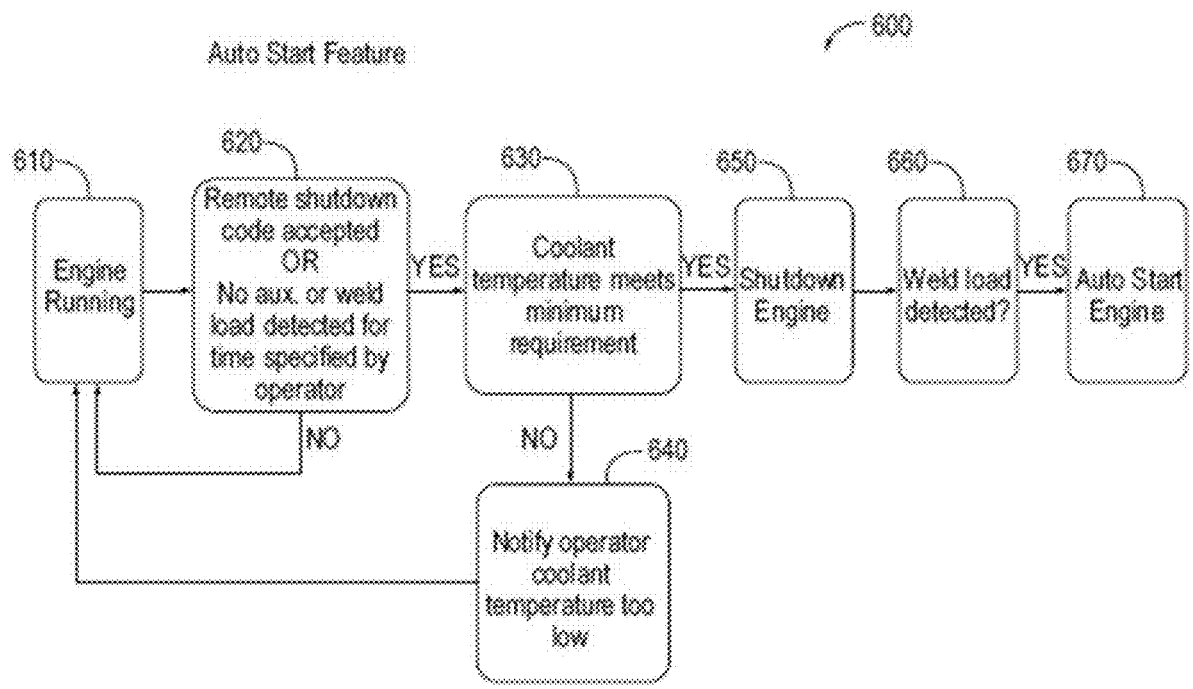
FIG. 6 illustrates a flow chart of one embodiment of a method providing an Auto-Start feature capability implemented in the engine-based welding system 300 of FIGS. 3-5.

FIG. 6 illustrates a flow chart of one embodiment of a method 600 providing an Auto-Start feature capability. At block 610, the engine is running. At block 620, a determination is made as to whether a remote shutdown code has been accepted or if there has been no auxiliary electrical load or welding electrical load detected for a time specified by the operator (a first specified time period). If no remote shutdown code has been accepted or if an auxiliary load or a welding load is detected within the time specified by the operator, then the method reverts to block 610 and the engine remains running. However, if a remote shutdown code has been accepted or if there has been no auxiliary load or welding load detected for the time specified by the operator, the method goes to block 630.

At block 630, a check is made to determine if a coolant temperature meets a minimum requirement. If the coolant temperature does not meet the minimum requirement, then at block 640 the operator is notified that the coolant temperature is too low and the method reverts to block 610 and the engine remains running. Otherwise, the method goes to block 650 where the engine is shut down. At block 660, if a welding electrical load (or an auxiliary electrical load) is detected during a specified time (second specified time period) after which the engine has been shut down then, at block 670, the engine is automatically restarted. Otherwise the engine remains shut down.

Figure 7:
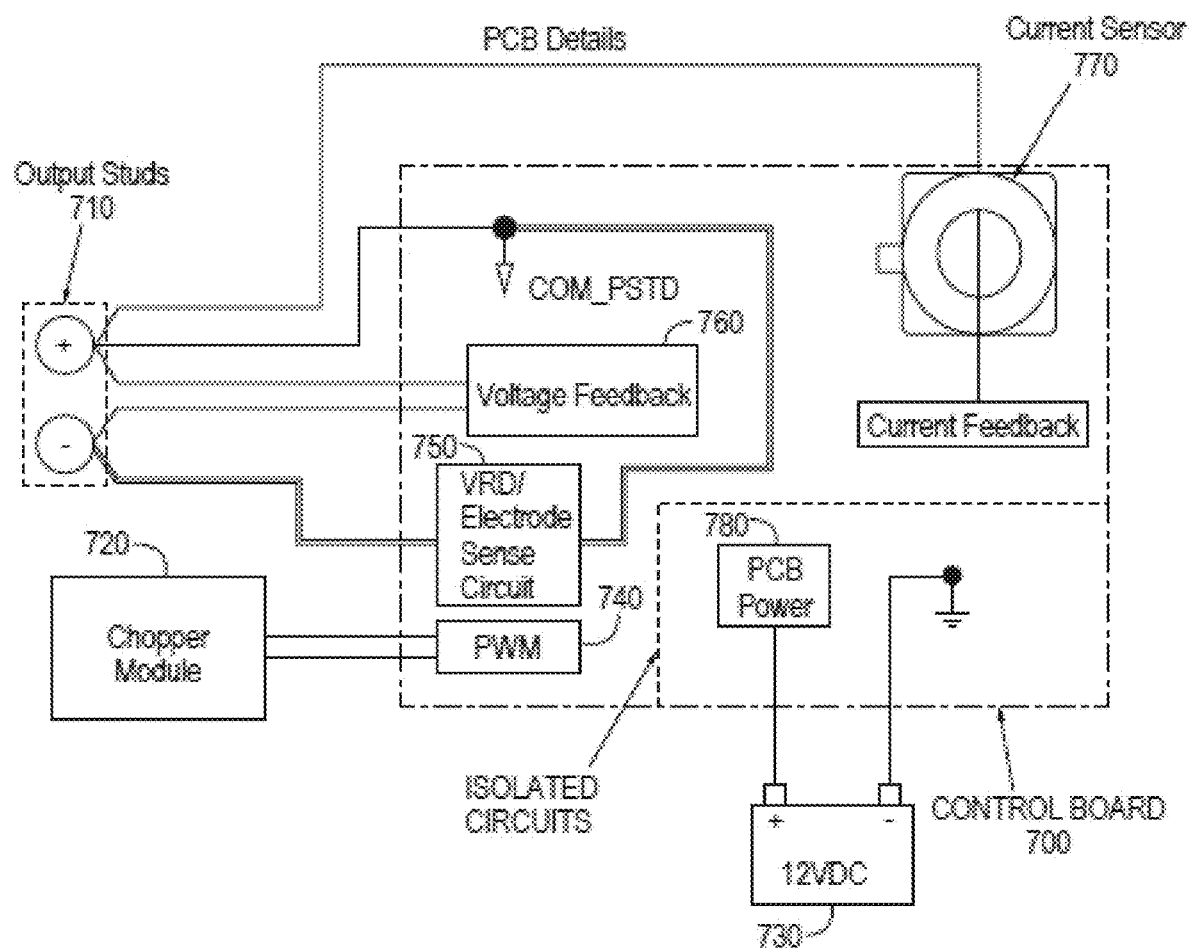
FIG. 7 illustrates certain details of one embodiment of a PCB control board of the engine-based welding system of FIG. 3.

FIG. 7 illustrates certain details of one embodiment of a PCB control board 700 of the engine-based welding system 300 of FIG. 3 as electrically connected to power output studs 710, a chopper module 720, and a battery 730 of the system 300. In accordance with one embodiment, the PCB control board 700 may be part of a controller similar to, for example, the controller 32 of FIG. 1 and FIG. 2. Furthermore, in accordance with one embodiment, the chopper module 720 may be similar to the chopper 44 of FIG. 2. The PCB control board 700 is configured to help facilitate the method 600 of FIG. 6 and includes a pulse width modulator (PWM) 740, a voltage reduction device (VRD)/electrode sense circuit 750, a voltage feedback circuit 760 providing voltage feedback, a current sensor 770 providing current feedback, and a power circuit 780 configured to distribute electrical power from the battery 730 to the various other components of the PCB control board 700.

In accordance with one embodiment, initial engine startup is done manually at the machine. (Glow plug operation is not included in the Auto-Start circuit.) To activate the Auto-Start feature, the user begins by going to "SETUP" on an LCD display screen (e.g., 302). Under "Auto-Start On/Off", the user selects "ON" to activate the Auto-Start feature. Under "No-Load Period", the user selects a period between, for example, 10 and 120 minutes. This corresponds to the specified time of block 620 of the method 600. Under "Tap Start Active Time Period", the user selects a period between, for example, 15 and 120 minutes. This corresponds to the specified time of block 660 of the method 600.

When the Auto-Start feature shuts off the engine (at block 650 of the method 600), the machine waits during the "Tap Start Active Time Period" for a start signal (e.g., initiated by tapping (contacting) the electrode to the workpiece or by activating the 2-4 switch on the welding gun). Once the start signal is sensed, the engine is started again (at block 670 of the method 600). However, if the "Tap Start Active Time Period" counts down to zero (0) seconds, the machine will be shut down completely and will not be able to be restarted by tapping (contacting) the electrode. The welder has to be restarted manually at the machine (this avoids draining the battery too much). Once the engine is running, a countdown to shutdown is displayed in seconds (during block 610 of the method 600) and is reset each time an electrical load is applied. If the coolant temperature is below, for example, 45 deg. C. (at block 630 of the method 600), the countdown will be held at, for example, one (1) second.

Just prior to auto engine shutdown (at block 650 of the method 600), the chopper 720 (or inverter) is shut down and the VRD/electrode sense circuit 750 (see FIG. 7) compares the external resistance across the output studs 710 to a Tap Start resistance threshold. If the external resistance is below the threshold, the engine is not shut down and the "No-Load Period" countdown resets. This avoids nuisance shutdowns and restarts when a very light load such as an across the arc wire feeder is connected. To successfully use the Auto-Start feature while wire welding with an across the arc feeder, the feeder's work (power) lead must be disconnected for the "No-Load Period". Reconnecting the lead will restart the machine.

After the countdown completes, the engine shuts down (at block 650 of the method 600) and a warning message flashes on the display indicating that the engine may start at any time. Optionally, if the engine coolant temperature is above, for example, 45 deg. C., the engine may be shut down prior to the countdown completing by entering, for example, a remote shutdown code (e.g., 0-10-5-10-0) on a remote control device of the engine-based system 300 (0.25 to 3 sec between each entry).

Once the engine shuts down, a countdown is displayed on the left display in seconds showing the remaining "Tap Start Active Time Period". The user can single tap (contact) the electrode against the workpiece to make electrical contact and hold contact momentarily (make electrical contact for a minimum of, for example, 50 ms. If the user holds the contact, the weld output will not be active until the user releases contact.) Once the user breaks contact, the user may start welding once the engine comes up to speed (e.g., 2 seconds later).

Figure 8:
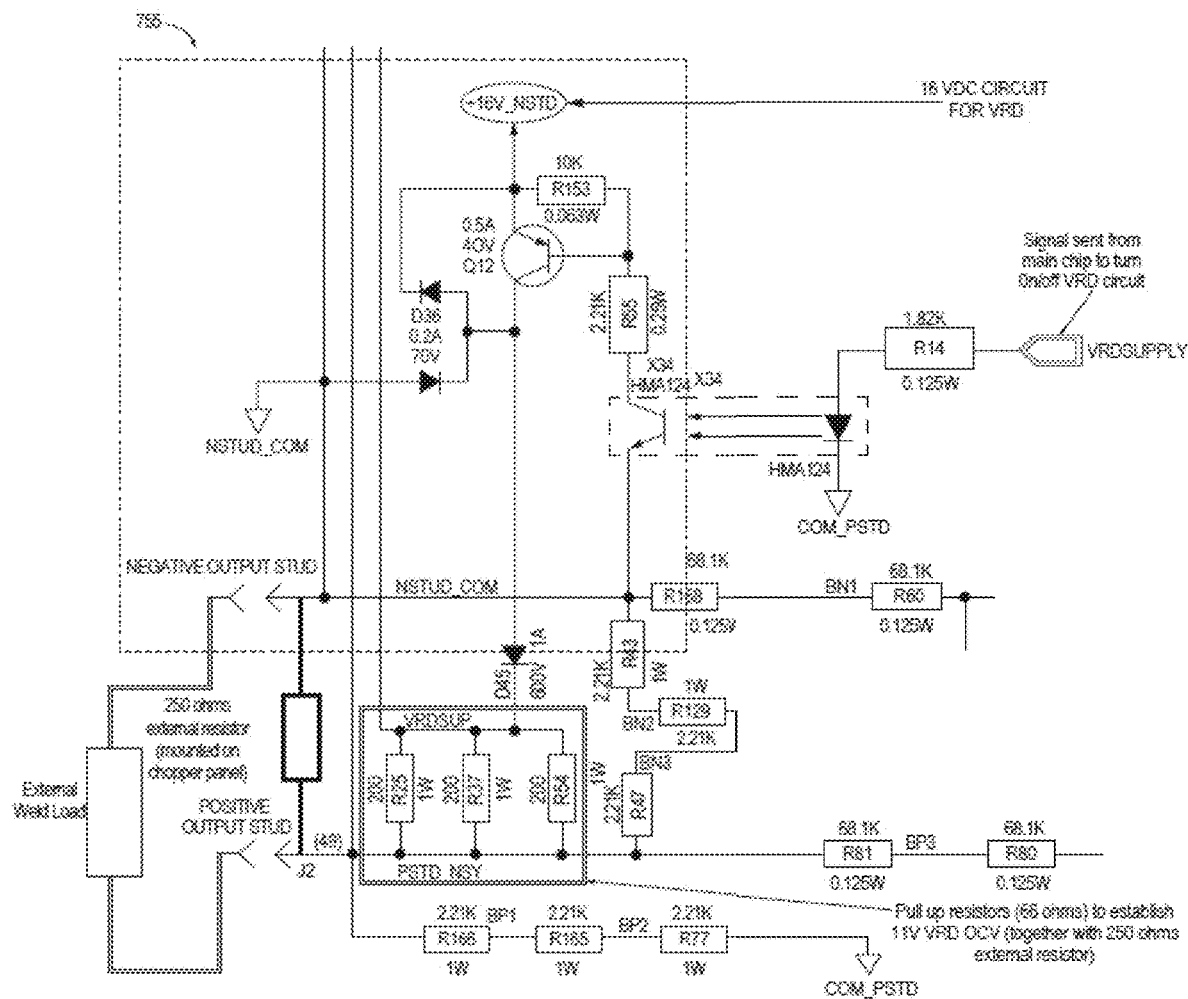
FIG. 8 illustrates one embodiment of a voltage reduction (VRD) circuit of a VRD/electrode sense circuit of the PCB control board of FIG. 7.

As an example, FIG. 8 illustrates one embodiment of a VRD circuit 755 of the VRD/electrode sense circuit 750 of the PCB control board 700 of FIG. 7. When the Auto-Start feature shutdowns the engine, the VRD circuit is turned "ON" by sending a signal (VRDSUPPLY) to the VRD circuit 755 (e.g., from a main chip of the control board 700), resulting in the chopper (or inverter) being shut off. Furthermore, a 16 VDC circuit is applied to the output studs. A 250 ohm resistor is connected to the output studs externally from the control board 700, resulting in a voltage divider to lower the 16 VDC supply circuit to 11 VDC open circuit voltage (OCV) on the output studs. In one embodiment, the 250 ohm resistor is on a chopper panel of the chopper module 720. The voltage on the output studs is constantly being monitored through two sense wires that send an analog signal to, for example, the main chip. When the operator taps (contacts) the welding electrode to the workpiece, a voltage drop is created on the voltage divider and the voltage drop is sensed via the monitoring of the output studs. If the 11 VDC OCV drops below 5 VDC, the machine is auto-started. In one embodiment, this occurs when the electrical load draws approximately 120 mA.

In accordance with one embodiment, for a constant voltage (CV) process, the engine is started by pressing a contact switch (e.g., the 2-4 contact switch) on the welding gun (a control cable may be used to support this). Should the engine fail to start after cranking (e.g., after cranking for 10 seconds), the engine can then be started manually at the machine.

The controls are designed to draw minimal power from the battery during the "Tap Start Active Time Period" (disconnect engine ECU, engine alternator flash circuit, etc.). The controls use almost no power after the "Tap Start Active Time Period" has timed out. During the "Tap Start Active Time Period", the welding system is treated as live. Therefore this window is limited to, for example, 2 hours maximum.

Figure 9:
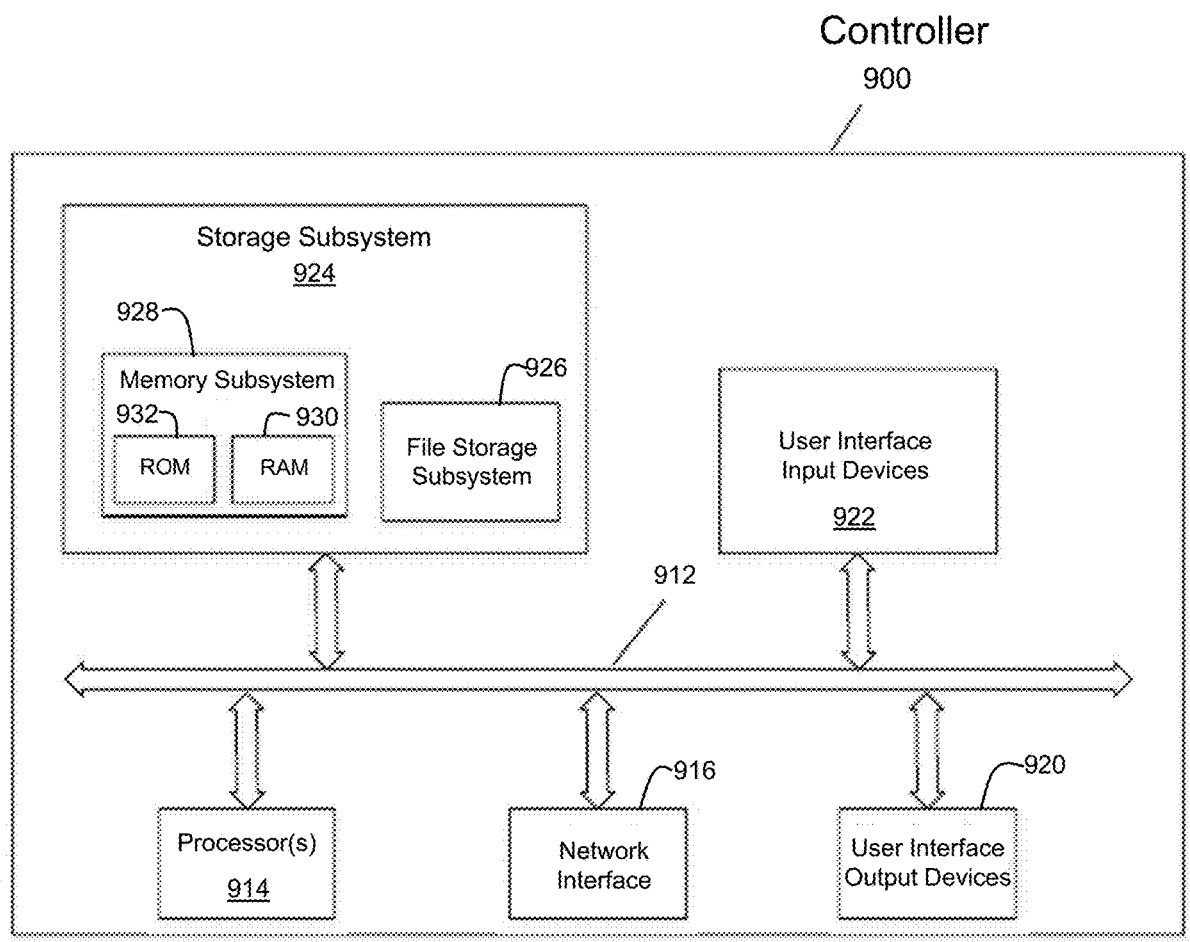
FIG. 9 illustrates an example embodiment of a controller (e.g., a controller used in the engine-based welding systems described herein)

FIG. 9 illustrates one embodiment of an example controller 900 (e.g., a controller used in the engine-based welding systems described herein). The controller 900 may be used as, for example, the controller 32 of FIG. 1 and FIG. 2. The controller 900 includes at least one processor 914 which communicates with a number of peripheral devices via bus subsystem 912. These peripheral devices may include a storage subsystem 924, including, for example, a memory subsystem 928 and a file storage subsystem 926, user interface input devices 922, user interface output devices 920, and a network interface subsystem 916. The input and output devices allow user interaction with the controller 900. Network interface subsystem 916 provides an interface to outside networks and is coupled to corresponding interface devices in other computer systems. For example, the controller 32 of the system 10 may share one or more characteristics with the controller 900 and may be, for example, a conventional computer, a digital signal processor, and/or other computing device.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 900 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 900 to the user or to another machine or computer system.

Storage subsystem 924 stores programming and data constructs that provide or support some or all of the functionality described herein (e.g., as software modules). For example, the storage subsystem 924 may include one or more software modules that support the Auto-Start feature, for example, as described herein.

Software modules are generally executed by processor 914 alone or in combination with other processors. Memory 928 used in the storage subsystem can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 926 in the storage subsystem 924, or in other machines accessible by the processor(s) 914.

Bus subsystem 912 provides a mechanism for letting the various components and subsystems of the controller 900 communicate with each other as intended. Although bus subsystem 912 is shown schematically as a single bus, alternative embodiments of the bus subsystem may use multiple buses.

The controller 900 can be of varying types including a workstation, server, computing cluster, blade server, server farm, or any other data processing system or computing device. Due to the ever-changing nature of computing devices and networks, the description of the controller 900 depicted in FIG. 9 is intended only as a specific example for purposes of illustrating some embodiments. Many other configurations of the controller 900 are possible having more or fewer components than the controller depicted in FIG. 9.

Wireless Controller Area Network (CAN) Communication with PCB

Figure 10:
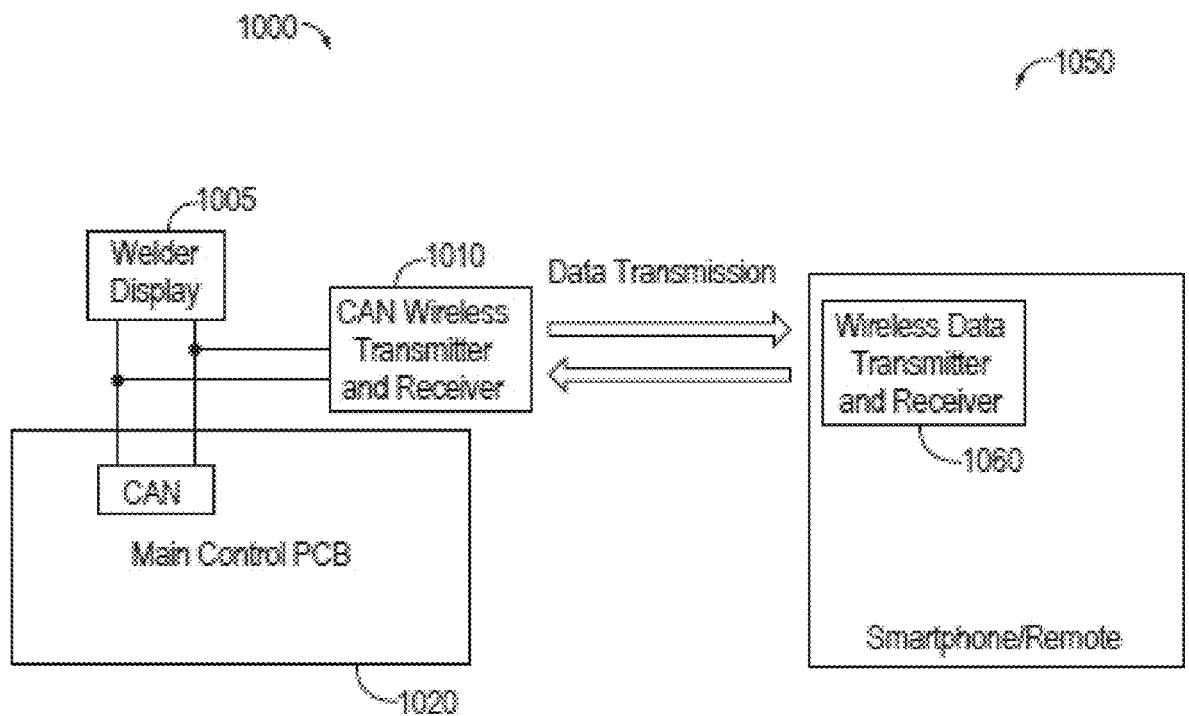
FIG. 10 illustrates one embodiment of wireless communication between an engine-based welding machine and a remote control device.

FIG. 10 illustrates one embodiment of wireless communication between an engine-based welding machine 1000, having a welder display 1005, and a remote control device 1050. The remote control device 1050 may be a dedicated remote control device or may be a smart phone having a remote control application and a wireless data transmitter and receiver 1060, in accordance with various embodiments. Referring to FIG. 10, a wireless CAN transmitter and receiver 1010 is fitted to the engine-based welding machine 1000. The CAN messages are generated by the main control PCB 1020. Once an operator enables a wireless remote mode of the welding machine 1000, the welding machine 1000 can be controlled by the wireless remote control device 1050. In accordance with one embodiment, an ignition switch of the welding machine 1000 is turned "ON" for the wireless remote control device 1050 to function. The wireless remote control device 1050 may use WiFi, BLUETOOTH®, or other methods of wireless data communication to receive and transmit the CAN messages, in accordance with various embodiments. The CAN bus of the welding machine 1000 is broadcast over WiFi, BLUETOOTH®, or other methods of wireless data transmission as well.

Figure 11:
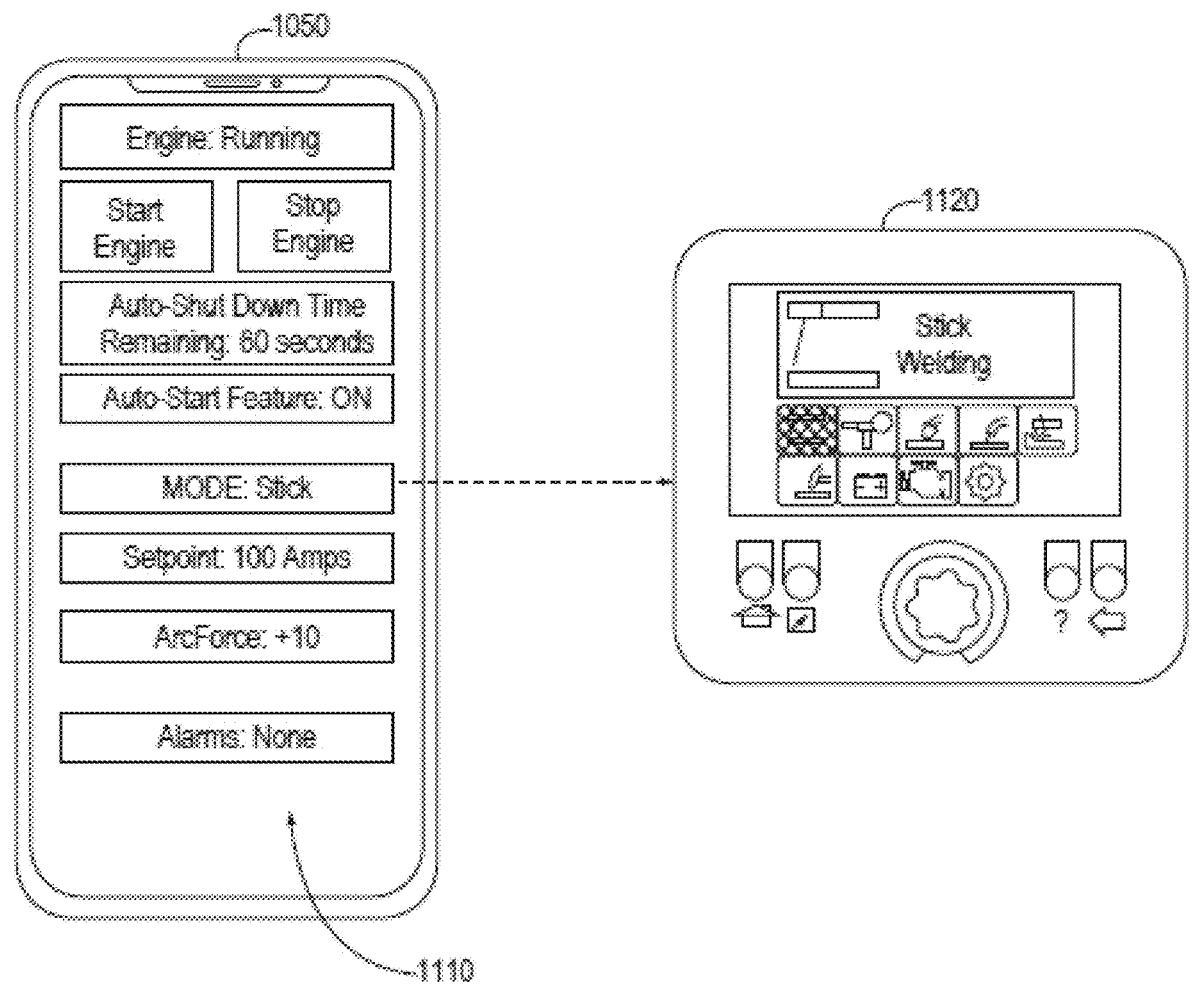
FIG. 11 illustrates examples of a smart phone application and a wireless remote control, in accordance with one embodiment.

FIG. 11 illustrates displayed examples 1110 and 1120 provided by a smart phone application on a wireless remote control device 1050, in accordance with one embodiment. For example, in one embodiment, the following can be controlled via the remote control device 1050: turn engine on/off, check auto-shutdown time reading, turn on/off auto start feature, change weld mode and weld output, monitor weld output current and voltage, check engine status (i.e., oil pressure, coolant temperature, RPM, etc.), display active alarms to alert the operator in case there is an issue.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof

What is claimed is:

1. A welding system, the system comprising:
an engine;
a generator operatively connected to the engine; and
a welding power source operatively connected to the generator and the engine and having a programmable processor-based controller, wherein the welding power source is configured to be electrically connected to a welding electrode and a workpiece, and wherein the programmable processor-based controller is configured to:
 determine that an electrical load on the welding system has not been detected for a specified no-load time period while the engine is running,
 determine that a coolant temperature is above a minimum requirement temperature,
 command shutdown of the engine in response to determining that the electrical load has not been detected for the specified no-load time period and that the coolant temperature is above the minimum requirement temperature,
 determine that the electrical load has been detected, in response to a single contact of the welding electrode to the workpiece, during a specified tap start active time period after the engine has been shut down, and
 command restart of the engine in response to determining that the electrical load has been detected during the specified tap start active time period.

2. The welding system of claim 1, wherein the electrical load is a welding electrical load.

3. The welding system of claim 1, wherein the electrical load is an auxiliary electrical load.

4. The welding system of claim 1, wherein the specified no-load time period is set by an operator of the welding system.

5. The welding system of claim 1, wherein the specified tap start active time period is set by an operator of the welding system.

6. The welding system of claim 1, wherein the programmable processor-based controller is configured to determine that the electrical load has not been detected during the specified tap start active time period after the engine has been shut down, and completely shut down the entire welding system.

7. The welding system of claim 1, wherein the single contact of the welding electrode to the workpiece provides that the welding electrode makes electrical contact with the workpiece for at least 50 milliseconds.

8. The welding system of claim 1, further comprising a battery configured to supply electrical power to at least the programmable processor-based controller, wherein the programmable processor-based controller is configured to draw less electrical power from the battery after the tap start active time period has timed out than during the tap start active time period.

9. The welding system of claim 1, wherein, prior to the programmable processor-based controller commanding shut down of the engine, the programmable processor-based controller is configured to:
 shut down a chopper or an inverter of the welding power source;
 compare an external resistance across output studs of the welding power source to a resistance threshold; and
 allow the engine to be commanded to be shut down unless the external resistance is above the resistance threshold.

10. The welding system of claim 9, wherein, when the external resistance is above the resistance threshold, the programmable processor-based controller is configured to:
 not command that the engine be shut down; and
 command resetting of a countdown of the first specified time period.

11. A method of providing and auto-start feature capability for an engine-based welding system having a programmable processor-based controller, comprising:
 when an engine of an engine-based welding system is running, a programmable processor-based controller of the engine-based welding system determining that a remote shutdown code has been accepted or that there has been no electrical load detected for a first specified time period;
 when the engine of the engine-based welding system is running, the programmable processor-based controller determining that a coolant temperature is above a minimum requirement temperature;
 the programmable processor-based controller shutting down the engine in response to determining that the coolant temperature is above the minimum requirement temperature and determining that no electrical load has been detected for the first specified time period;
 the programmable processor-based controller determining that the electrical load has been detected, in response to a single contact of a welding electrode to a workpiece, during a second specified time period after the engine has been shut down; and
 the programmable processor-based controller commanding restart of the engine in response to determining that the electrical load has been detected during the second specified time period.

12. The method of claim 11, wherein the electrical load is a welding electrical load.

13. The method of claim 11, wherein the electrical load is an auxiliary electrical load.

14. The method of claim 11, wherein the first specified time period is set by an operator of the engine-based welding system.

15. The method of claim 11, wherein the second specified time period is set by an operator of the engine-based welding system.

16. The method of claim 11, further comprising the programmable processor-based controller determining that the electrical load has not been detected during the second specified time period after the engine has been shut down, and completely shutting down the entire engine-based welding system.

17. The method of claim 11, wherein the single contact of the welding electrode to the workpiece provides that the welding electrode makes electrical contact with the workpiece for at least 50 milliseconds.

18. The method of claim 11, further comprising the programmable processor-based controller drawing less electrical power from a battery of the engine-based welding system after the second specified time period has timed out than during the second specified time period.

19. The method of claim 11, further comprising, just prior to the programmable processor-based controller shutting down the engine, the programmable processor-based controller:
 shutting down a chopper or an inverter of the engine-based welding system;
 comparing an external resistance across output studs of the engine-based welding system to a resistance threshold; and
 allowing the shutting down of the engine, unless the external resistance is above the resistance threshold.

20. The method of claim 19, further comprising, when the external resistance is above the resistance threshold, the programmable processor-based controller:
 not allowing the shutting down of the engine; and
 resetting a countdown of the first specified time period.

* * * * *